(12) United States Patent
Nishio et al.

(10) Patent No.: US 9,284,874 B2
(45) Date of Patent: *Mar. 15, 2016

(54) SILICOALUMINOPHOSPHATE PARTICLES, HONEYCOMB STRUCTURE, METHOD FOR MANUFACTURING THE SAME AND EXHAUST GAS PURIFYING APPARATUS

(75) Inventors: Yoshitoyo Nishio, Gifu (JP); Takunari Murakami, Gifu (JP)

(73) Assignee: IBIDEN CO., LTD., Gifu (JP)

( * ) Notice: Subject to any disclaimer, the term of this patent is extended or adjusted under 35 U.S.C. 154(b) by 130 days.

This patent is subject to a terminal disclaimer.

(21) Appl. No.: 14/128,543

(22) PCT Filed: Aug. 18, 2011

(86) PCT No.: PCT/JP2011/068708
§ 371 (c)(1),
(2), (4) Date: Dec. 20, 2013

(87) PCT Pub. No.: WO2013/024549
PCT Pub. Date: Feb. 21, 2013

(65) Prior Publication Data
US 2014/0135204 A1 May 15, 2014

(51) Int. Cl.
*B01J 21/12* (2006.01)
*B01J 27/182* (2006.01)
(Continued)

(52) U.S. Cl.
CPC .......... *F01N 3/2803* (2013.01); *B01D 53/9418* (2013.01); *B01J 29/85* (2013.01);
(Continued)

(58) Field of Classification Search
CPC ........ B01J 21/12; B01J 27/182; B01J 29/044; B01J 29/85

USPC .............. 502/64, 214, 439; 423/213.2, 239.2, 423/DIG. 30; 422/177, 180
See application file for complete search history.

(56) References Cited

U.S. PATENT DOCUMENTS

| 6,414,208 B1 | 7/2002 | Tsutsui et al. |
| 8,808,633 B2 * | 8/2014 | Kunieda et al. ............... 422/177 |

(Continued)

FOREIGN PATENT DOCUMENTS

| EP | 2269733 A1 | 1/2011 |
| JP | 2000-344690 A | 12/2000 |

(Continued)

OTHER PUBLICATIONS

Alvaro-Munoz, T. et al., "Use of Different Templates on SAPO-34 Synthesis: Effect on the Acidity and Catalytic Activity in the MTO Reaction," Catalysis Today, Elsevier, NL, Jul. 25, 2011, pp. 27-34, vol. 179, No. 1.

(Continued)

*Primary Examiner* — Patricia L Hailey
(74) *Attorney, Agent, or Firm* — Fenwick & West LLP

(57) ABSTRACT

Objects of the invention are to provide silicoaluminophosphate particles that have excellent NOx purification performance and can suppress water adsorption-caused contraction and water desorption-caused expansion and to provide a honeycomb structure that has excellent NOx purification performance and can suppress the breakage of the honeycomb unit due to the adsorption or desorption of water, a method for manufacturing the honeycomb structure, and an exhaust gas purifying apparatus including the honeycomb structure. The silicoaluminophosphate particles of the invention have a metallic oxide attached to silicoaluminophosphate particles with a ratio of an amount of Si to a sum of amounts of Al and P in a range of 0.16 to 0.33, in which a specific surface area is in a range of 250 $m^2/g$ to 450 $m^2/g$, and an external surface area is in a range of 10 $m^2/g$ to 35 $m^2/g$.

16 Claims, 3 Drawing Sheets

(51) Int. Cl.

| | | |
|---|---|---|
| *F01N 3/28* | (2006.01) | |
| *B01J 29/85* | (2006.01) | |
| *B01J 35/04* | (2006.01) | |
| *B01J 35/10* | (2006.01) | |
| *C01B 37/08* | (2006.01) | |
| *C01B 39/54* | (2006.01) | |
| *B01J 37/00* | (2006.01) | |
| *C04B 35/447* | (2006.01) | |
| *C04B 35/624* | (2006.01) | |
| *C04B 35/626* | (2006.01) | |
| *C04B 35/63* | (2006.01) | |
| *C04B 35/82* | (2006.01) | |
| *C04B 37/00* | (2006.01) | |
| *C04B 38/00* | (2006.01) | |
| *B01D 53/94* | (2006.01) | |
| *C04B 111/00* | (2006.01) | |

(52) U.S. Cl.
CPC ............... *B01J 35/04* (2013.01); *B01J 35/10* (2013.01); *B01J 35/1019* (2013.01); *B01J 37/0009* (2013.01); *C01B 37/08* (2013.01); *C01B 39/54* (2013.01); *C04B 35/447* (2013.01); *C04B 35/624* (2013.01); *C04B 35/6263* (2013.01); *C04B 35/6269* (2013.01); *C04B 35/6303* (2013.01); *C04B 35/6316* (2013.01); *C04B 35/82* (2013.01); *C04B 37/005* (2013.01); *C04B 38/0006* (2013.01); *B01D 2251/2067* (2013.01); *B01D 2255/20761* (2013.01); *B01D 2255/50* (2013.01); *B01D 2255/9207* (2013.01); *B01J 2229/20* (2013.01); *C01P 2006/12* (2013.01); *C04B 2111/0081* (2013.01); *C04B 2111/00793* (2013.01); *C04B 2235/3217* (2013.01); *C04B 2235/3218* (2013.01); *C04B 2235/3232* (2013.01); *C04B 2235/3281* (2013.01); *C04B 2235/349* (2013.01); *C04B 2235/3418* (2013.01); *C04B 2235/522* (2013.01); *C04B 2235/526* (2013.01); *C04B 2235/5224* (2013.01); *C04B 2235/5228* (2013.01); *C04B 2235/5232* (2013.01); *C04B 2235/5244* (2013.01); *C04B 2235/5264* (2013.01); *C04B 2235/5276* (2013.01); *C04B 2235/5292* (2013.01); *C04B 2235/5409* (2013.01); *C04B 2235/5436* (2013.01); *C04B 2237/10* (2013.01); *C04B 2237/34* (2013.01); *C04B 2237/708* (2013.01)

(56) References Cited

U.S. PATENT DOCUMENTS

| | | | |
|---|---|---|---|
| 2009/0196812 A1 | 8/2009 | Bull et al. | |
| 2010/0310440 A1 | 12/2010 | Bull et al. | |
| 2010/0317910 A1 | 12/2010 | Mies et al. | |
| 2011/0142737 A1* | 6/2011 | Seyler et al. | 423/213.2 |
| 2012/0058018 A1* | 3/2012 | Kunieda et al. | 422/177 |
| 2014/0127088 A1* | 5/2014 | Miyashita et al. | 422/180 |
| 2014/0296059 A1* | 10/2014 | Suenobu et al. | 502/60 |
| 2015/0065336 A1* | 3/2015 | Sato et al. | 502/67 |

FOREIGN PATENT DOCUMENTS

| | | |
|---|---|---|
| JP | 2006-273710 A | 10/2006 |
| JP | 2011-510899 A | 4/2011 |
| JP | 2011-125846 A | 6/2011 |
| JP | 2011-125848 A | 6/2011 |
| JP | 2011-125849 A | 6/2011 |
| JP | 2011-125851 A | 6/2011 |
| WO | WO 2009/099937 A1 | 8/2009 |

OTHER PUBLICATIONS

Danilina, N. et al., "Hierarchical SAPO-5 Catalysts Active in Acid-Catalyzed Reactions," Journal of Catalysts, Academic Press, Duluth, MN, US, May 25, 2010, pp. 37-43, vol. 272, No. 1.

Danilina, N. et al., "Influence of Synthesis Parameters on the Catalytic Activity of Hierarchical SAPO-5 in Space—Demanding Alkylation Reactions," Catalysis Today, Elsevier, NL, Jan. 26, 2011, pp. 80-85, vol. 168, No. 1.

European Extended Search Report, European Application No. 11870860.1, Mar. 27, 2015, 6 pages.

Izadbakhsh, A. et al., "Effect of SAPO-34's Composition on Its Physico-Chemical Properties and Deactivation in MTO Process," Applied Catalysis A: General, Elsevier Science, NL, Jul. 31, 2009, pp. 48-56, vol. 364, No. 1-2.

PCT International Search Report, with English translation, and Written Opinion, PCT/JP2011/068708, Sep. 20, 2011, 20 Pages.

* cited by examiner

SILICOALUMINOPHOSPHATE PARTICLES, HONEYCOMB STRUCTURE, METHOD FOR MANUFACTURING THE SAME AND EXHAUST GAS PURIFYING APPARATUS

TECHNICAL FIELD

The present invention relates to silicoaluminophosphate particles, a honeycomb structure, a method for manufacturing the honeycomb structure and an exhaust gas purifying apparatus.

BACKGROUND ART

In the related art, a selective catalytic reduction (SCR) system that reduces NOx into nitrogen and water using ammonia is known as one of many systems that purify exhaust gas from vehicles.

In addition, zeolite is known as a material that adsorbs ammonia in the selective catalytic reduction system.

PTL 1 discloses a honeycomb structure including a honeycomb unit that contains zeolite, an inorganic fiber and/or whisker, and an inorganic binder.

Meanwhile, SAPO-34 is known as zeolite having excellent NOx purification performance.

CITATION LIST

Patent Literature

[PTL 1] PCT International Publication No. WO 06/137149

SUMMARY OF INVENTION

Technical Problem

However, SAPO-34 contracts or expands due to the adsorption or desorption of water, which causes a change in the lattice constant. Therefore, in the honeycomb structure including a honeycomb unit that contains SAPO-34, there is a problem in that the honeycomb unit is easily broken due to SAPO-34 adsorbing or desorbing water.

The invention has been made in consideration of the problem of the related art, and an object of the invention is to provide silicoaluminophosphate particles that have excellent NOx purification performance and can suppress water adsorption-caused contraction and water desorption-caused expansion.

In addition, another object of the invention is to provide a honeycomb structure that has excellent NOx purification performance and can suppress the breakage of the honeycomb unit due to the adsorption or desorption of water, a method for manufacturing the honeycomb structure, and an exhaust gas purifying apparatus including the honeycomb structure.

Solution to Problem

Silicoaluminophosphate particles of the invention have a ratio of an amount of Si to a sum of amounts of Al and P in a range of 0.16 to 0.33, a specific surface area in a range of 250 $m^2/g$ to 450 $m^2/g$, and an external surface area in a range of 10 $m^2/g$ to 35 $m^2/g$.

In the silicoaluminophosphate particles of the invention, the specific surface area is desirably in a range of 300 $m^2/g$ to 440 $m^2/g$, and more desirably in a range of 320 $m^2/g$ to 400 $m^2/g$.

In the silicoaluminophosphate particles of the invention, the external surface area is desirably in a range of 15 $m^2/g$ to 30 $m^2/g$, and more desirably in a range of 20 $m^2/g$ to 30 $m^2/g$.

The silicoaluminophosphate particles of the invention are desirably ion-exchanged with copper ions and/or iron ions.

A honeycomb structure of the invention includes a honeycomb unit provided with a plurality of through holes arrayed in a longitudinal direction with a partition wall therebetween, in which the honeycomb unit is produced by extrusion-molding and firing raw material paste containing the silicoaluminophosphate particles of the invention and an inorganic binder.

In the honeycomb unit, a content of the silicoaluminophosphate particles per apparent volume is desirably in a range of 230 g/L to 360 g/L. Meanwhile, the apparent volume refers to a volume of an outer circumference including a volume of voids.

The inorganic binder is desirably a solid content contained in one or more selected from a group consisting of an alumina sol, a silica sol, a titania sol, water glass, sepiolite, attapulgite and boehmite.

The raw material paste desirably further contains one or more selected from a group consisting of inorganic fibers, scale-like substances, tetrapot-like substances and three dimensional needle-like substances.

The inorganic fiber is desirably one or more selected from a group consisting of alumina, silica, silicon carbide, silica alumina, glass, potassium titanate and aluminum borate; the scale-like substance is desirably one or more selected from a group consisting of glass, muscovite, alumina and silica, the tetrapot-like substance is desirably zinc oxide; and the three dimensional needle-like substance is desirably one or more selected from a group consisting of alumina, silica, silicon carbide, silica alumina, glass, potassium titanate, aluminum borate and boehmite.

The honeycomb structure of the invention desirably includes a plurality of the honeycomb units.

In the honeycomb structure of the invention, a NOx purification rate is desirably 85% or more in a case in which 200° C.-hot simulant gas is made to flow into the honeycomb structure so that a space velocity becomes 80000/h, the space velocity is desirably a ratio of a flow rate [$m^3/h$] of the simulant gas to an apparent volume [$m^3$] of the honeycomb structure, and the simulant gas desirably contains nitrogen monoxide at a concentration of 350 ppm, ammonia at a concentration of 350 ppm, oxygen at a concentration of 10%, water at a concentration of 5% and carbon dioxide at a concentration of 5% with a balance of nitrogen.

The honeycomb structure of the invention includes a honeycomb unit which contains cordierite and is provided with a plurality of through holes arrayed in a longitudinal direction with a partition wall therebetween, in which the silicoaluminophosphate particles of the invention are supported by the partition wall.

According to the invention, there is provided a method for manufacturing the honeycomb structure provided with a plurality of through holes arrayed in a longitudinal direction with a partition wall therebetween. The method includes a step of extrusion-molding raw material paste containing the silicoaluminophosphate particles of the invention and an inorganic binder, and a step of firing the extrusion-molded raw material paste so as to produce the honeycomb unit.

In an exhaust gas purifying apparatus of the invention, the honeycomb structure of the invention is accommodated in a metal container in a state in which a holding seal material is disposed on an outer circumferential surface of the honeycomb structure of the invention excluding both end surfaces.

Advantageous Effects of Invention

According to the invention, it is possible to provide silicoaluminophosphate particles that have excellent NOx purification performance and can suppress water adsorption-caused contraction and water desorption-caused expansion.

In addition, according to the invention, it is possible to provide a honeycomb structure that has excellent NOx purification performance and can suppress the breakage of the honeycomb unit due to the adsorption or desorption of water, a method for manufacturing the honeycomb structure, and an exhaust gas purifying apparatus including the honeycomb structure.

DESCRIPTION OF EMBODIMENTS

Next, embodiments for carrying out the invention will be described with reference to the accompanying drawings.

Figure 1:
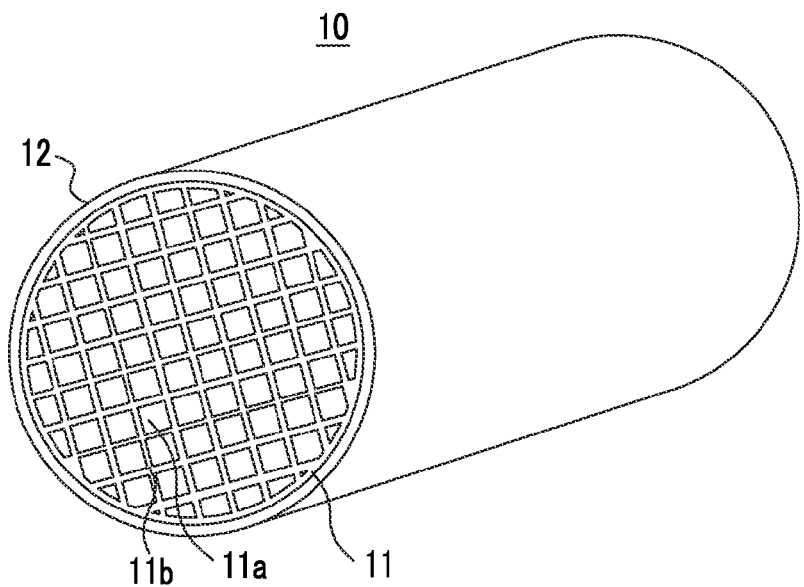
FIG. 1 is a perspective view illustrating an example of a honeycomb structure of the invention.

FIG. 1 illustrates an example of a honeycomb structure of the invention. A honeycomb structure 10 includes a single honeycomb unit 11 provided with a plurality of through holes 11a arrayed in a longitudinal direction with a partition wall 11b therebetween. In addition, the honeycomb unit 11 is produced by extrusion-molding and firing raw material paste containing silicoaluminophosphate (SAPO) particles and an inorganic binder. Furthermore, an outer circumference coating layer 12 is formed on an outer circumferential surface of the honeycomb unit 11 excluding both end surfaces.

Hereinafter, the silicoaluminophosphate particles refer to the silicoaluminophosphate particles contained in the raw material paste.

In the silicoaluminophosphate particles, the ratio of the amount of Si to the sum of the amounts of Al and P is in a range of 0.16 to 0.33, preferably in a range of 0.16 to 0.28, and more preferably in a range of 0.20 to 0.25. When the ratio of the amount of Si to the sum of the amounts of Al and P in the silicoaluminophosphate particles is less than 0.16, it becomes difficult to suppress the water adsorption-caused contraction and water desorption-caused expansion of the silicoaluminophosphate particles. On the other hand, when the ratio of the amount of Si to the sum of the amounts of Al and P in the silicoaluminophosphate particles exceeds 0.33, the silicoaluminophosphate particles become amorphous, and it becomes difficult to produce the honeycomb unit 11.

Meanwhile, as the unit of the amount in the invention, 'mol' is used, and the ratio (molar ratio) of the amount [mol] of Si to the sum of the amounts [mol] of Al and P in the silicoaluminophosphate particles can be measured using energy dispersive X-ray spectroscopy (EDS).

The specific surface area of the silicoaluminophosphate particles is in a range of $250 \text{ m}^2/\text{g}$ to $450 \text{ m}^2/\text{g}$, preferably in a range of $260 \text{ m}^2/\text{g}$ to $445 \text{ m}^2/\text{g}$, more preferably in a range of $300 \text{ m}^2/\text{g}$ to $440 \text{ m}^2/\text{g}$, and still more preferably in a range of $320 \text{ m}^2/\text{g}$ to $400 \text{ m}^2/\text{g}$. When the specific surface area of the silicoaluminophosphate particles is less than $250 \text{ m}^2/\text{g}$, since the number of pores in the honeycomb unit 11 decreases, exhaust gas cannot easily infiltrate into an inside of the partition wall 11b in the honeycomb unit 11, and it becomes impossible to effectively use the silicoaluminophosphate particles for NOx purification. On the other hand, when the specific surface area of the silicoaluminophosphate particles exceeds $450 \text{ m}^2/\text{g}$, it becomes difficult to suppress the water adsorption-caused contraction and water desorption-caused expansion of the silicoaluminophosphate particles.

The external surface area of the silicoaluminophosphate particles is in a range of $10 \text{ m}^2/\text{g}$ to $35 \text{ m}^2/\text{g}$, preferably in a range of $15 \text{ m}^2/\text{g}$ to $30 \text{ m}^2/\text{g}$, and more preferably in a range of $20 \text{ m}^2/\text{g}$ to $30 \text{ m}^2/\text{g}$. When the external surface area of the silicoaluminophosphate particles is less than $10 \text{ m}^2/\text{g}$, it becomes difficult to suppress the water adsorption-caused contraction and water desorption-caused expansion of the silicoaluminophosphate particles. On the other hand, it is difficult to manufacture silicoaluminophosphate particles having an external surface area of larger than $35 \text{ m}^2/\text{g}$.

Meanwhile, the external surface area refers to a surface area excluding the surface area of fine pores per unit mass.

Generally, the silicoaluminophosphate particles have a specific surface area of approximately $500 \text{ m}^2/\text{g}$ and an external surface area of approximately $5 \text{ m}^2/\text{g}$; however, in the invention, it is possible to set the specific surface area of the silicoaluminophosphate particles to $450 \text{ m}^2/\text{g}$ or less and to set the external surface area to $10 \text{ m}^2/\text{g}$ or more by carrying out an alkali treatment on the silicoaluminophosphate particles so as to change some of the crystal structure, and then carrying out an acid treatment so as to make the changed crystal structure become amorphous.

The alkali being used in the alkali treatment is not particularly limited, examples thereof include ammonia, sodium hydroxide and the like.

An acid used in the acid treatment is not particularly limited, and examples thereof include nitric acid and the like.

Meanwhile, the specific surface area of the silicoaluminophosphate particles can be measured using a BET multipoint method ($N_2$ adsorption method). In addition, when the specific surface area of the silicoaluminophosphate particles is measured, for example, an automatic surface area and porosimetry analyzer TriStar-3000 (manufactured by Shimadzu Corporation) can be used.

In addition, the external surface area of the silicoaluminophosphate particles can be measured using a t-plot method ($N_2$ adsorption method). When the external surface area of the silicoaluminophosphate particles is measured, for example, an automatic surface area and porosimetry analyzer TriStar-3000 (manufactured by Shimadzu Corporation) can be used.

At this time, an analysis method when measuring the external surface area using the t-plot method is described in, for example, Japanese Unexamined Patent Application Publication No. 2000-344690 and the like.

The silicoaluminophosphate particles are silicoaluminophosphate particles having the metallic oxide attached to the silicoaluminophosphate particles with a ratio of the amount of Si to the sum of the amounts of Al and P in a range of 0.16 to 0.28, in which the specific surface area is preferably in a range of $260 \text{ m}^2/\text{g}$ to $445 \text{ m}^2/\text{g}$, and the external surface area is preferably in a range of $30 \text{ m}^2/\text{g}$ to $85 \text{ m}^2/\text{g}$. Then, it is possible to obtain the honeycomb structure 10 that has excellent NOx purification performance and can further suppress the breakage of the honeycomb unit due to the adsorption or desorption of water.

The silicoaluminophosphate particles can be produced by adding phosphoric acid, aluminum hydroxide, silica and a structure directing agent (SDA) to water so as to produce a precursor gel, and then carrying out heating and an alkali treatment on the precursor gel.

Meanwhile, the structure directing agent refers to a mold used to form a fine regular structure when producing the silicoaluminophosphate particles.

At this time, it is possible to control the ratio of the amount of Si to the sum of the amounts of Al and P in the silicoaluminophosphate particles by adjusting the ratio of the amount of silica to the sum of the amounts of the phosphoric acid and the aluminum hydroxide. In addition, it is possible to control the specific surface area and the external surface area of the silicoaluminophosphate particles by adjusting the condition for immersing the silicoaluminophosphate particles in the sol of the metallic oxide.

The structure directing agent is not particularly limited, examples thereof include morpholine, diethylamine, tetraethylammonium hydroxide, triethylamine and the like, and two or more structure directing agents may be jointly used.

The silicoaluminophosphate particles are preferably ion-exchanged with copper ions and/or iron ions in consideration of NOx purification performance.

In the silicoaluminophosphate particles being ion-exchanged with copper ions and/or iron ions, the ion exchange amount is preferably in a range of 1.0% by mass to 5.0% by mass. When the ion exchange amount of the silicoaluminophosphate particles is less than 1.0% by mass, the effect that improves NOx purification performance becomes small. On the other hand, when the ion exchange amount of the silicoaluminophosphate particles exceeds 5.0% by mass, hydrothermal durability degrades, and NOx purification performance degrades at a high temperature of, for example, 500° C. or higher.

Meanwhile, the silicoaluminophosphate particles may be ion-exchanged with other metallic ions.

The average diameter of original silicoaluminophosphate particles of the silicoaluminophosphate particles is preferably in a range of 2.0 μm to 6.0 μm. When the average diameter of original silicoaluminophosphate particles of the silicoaluminophosphate particles is less than 2.0 μm, exhaust gas cannot easily infiltrate into the inside of the partition wall 11b, and it becomes impossible to effectively use the silicoaluminophosphate particles for NOx purification. On the other hand, when the average diameter of original silicoaluminophosphate particles of the silicoaluminophosphate particles exceeds 6.0 μm, the porosity of the honeycomb unit 11 increases such that the strength of the honeycomb unit 11 decreases or the specific surface area of the silicoaluminophosphate particles decreases such that NOx purification performance degrades.

Generally, the average diameter of original silicoaluminophosphate particles of the silicoaluminophosphate particles is approximately 20 μm, but the average diameter of original silicoaluminophosphate particles can be decreased by crushing the silicoaluminophosphate particles.

Meanwhile, the average diameter of original silicoaluminophosphate particles of the silicoaluminophosphate particles can be measured using a laser diffraction-type particle size distribution analyzer.

In the honeycomb unit 11, the content of the silicoaluminophosphate particles per apparent volume is preferably in a range of 230 g/L to 360 g/L. When the content of the silicoaluminophosphate particles per apparent volume of the honeycomb unit 11 is less than 230 g/L, it is necessary to increase the apparent volume of the honeycomb unit 11 in order to improve NOx purification performance. On the other hand, when the content of the silicoaluminophosphate particles per apparent volume of the honeycomb unit 11 exceeds 360 g/L, the strength of the honeycomb unit 11 becomes insufficient, or the aperture ratio of the honeycomb unit 11 becomes small.

Meanwhile, the apparent volume refers to the volume of the outer circumference including the volume of voids.

The inorganic binder contained in the raw material paste is not particularly limited, examples thereof include solid contents contained in an alumina sol, a silica sol, a titania sol, water glass, sepiolite, attapulgite, boehmite and the like, and two or more inorganic binders may be jointly used.

The content of the solid content of the inorganic binder contained in the solid content of the raw material paste is preferably in a range of 5% by mass to 30% by mass, and more preferably in a range of 10% by mass to 20% by mass. When the content of the inorganic binder in the solid content of the raw material paste is less than 5% by mass, the strength of the honeycomb unit 11 decreases. On the other hand, when the content of the solid content of the inorganic binder contained in the solid content of the raw material paste exceeds 30% by mass, it becomes difficult to extrusion-mold the honeycomb unit 11.

The raw material paste preferably further contains one or more selected from a group consisting of inorganic fibers, scale-like substances, tetrapot-like substances and three dimensional needle-like substances in order to improve the strength of the honeycomb unit 11.

A material that configures the inorganic fiber contained in the raw material paste is not particularly limited, examples thereof include alumina, silica, silicon carbide, silica alumina, glass, potassium titanate, aluminum borate and the like, and two or more materials may be jointly used.

The aspect ratio of the inorganic fiber contained in the raw material paste is preferably in a range of 2 to 1000, more preferably in a range of 5 to 800, and still more preferably in a range of 10 to 500. When the aspect ratio of the inorganic fiber contained in the raw material paste is smaller than 2, the effect that improves the strength of the honeycomb unit 11 becomes small. On the other hand, when the aspect ratio of the inorganic fiber contained in the raw material paste exceeds 1000, clogging and the like occur in a mold when extrusion-molding the honeycomb unit 11 or the inorganic fiber breaks such that the effect that improves the strength of the honeycomb unit 11 becomes small.

The scale-like substance refers to a flat substance, the thickness is preferably in a range of 0.2 μm to 5.0 μm, the maximum length is preferably in a range of 10 μm to 160 μm, and the ratio of the maximum length to the thickness is preferably in a range of 3 to 250.

A material that configures the scale-like substance contained in the raw material paste is not particularly limited, examples thereof include glass, muscovite, alumina, silica and the like, and two or more materials may be jointly used.

The tetrapot-like substance refers to a substance in which a needle-like portion three-dimensionally extends, the average length of the needle shapes in the needle-like portion is preferably in a range of 5 μm to 30 μm, and the average diameter of the needle-like portion is preferably in a range of 0.5 μm to 5.0 μm.

A material that configures the tetrapot-like substance contained in the raw material paste is not particularly limited, examples thereof include zinc oxide, and two or more materials may be jointly used.

The three dimensional needle-like substance refers to a substance in which needle-like portions are bonded to each other near the centers of the respective needle-like portions through an inorganic compound such as glass, the average length of the needle shapes in the needle-like portion is preferably in a range of 5 μm to 30 μm, and the average diameter of the needle-like portion is preferably in a range of 0.5 μm to 5.0 μm.

In addition, in the three dimensional needle-like substance, a plurality of needle-like portions may be connected to each other three-dimensionally, the diameter of the needle-like portion is preferably in a range of 0.1 μm to 5.0 μm, the length is preferably in a range of 0.3 μm to 30.0 μm, and the ratio of the length to the diameter is preferably in a range of 1.4 to 50.0.

A material that configures the three dimensional needle-like substance contained in the raw material paste is not particularly limited, examples thereof include alumina, silica, silicon carbide, silica alumina, glass, potassium titanate, aluminum borate, boehmite and the like, and two or more materials may be jointly used.

The content of the inorganic fibers, the scale-like substances, the tetrapot-like substances and the three dimensional needle-like substances in the solid content of the raw material paste is preferably in a range of 3% by mass to 50% by mass, more preferably in a range of 3% by mass to 30% by mass, and still more preferably in a range of 5% by mass to 20% by mass. When the content of the inorganic fibers, the scale-like substances, the tetrapot-like substances and the three dimensional needle-like substances in the solid content of the raw material paste is less than 3% by mass, the effect that improves the strength of the honeycomb unit 11 becomes small. On the other hand, when the content of the inorganic fibers, the scale-like substances, the tetrapot-like substances and the three dimensional needle-like substances in the solid content of the raw material paste exceeds 50% by mass, the content of the silicoaluminophosphate particles in the honeycomb unit 11 decreases, and NOx purification performance degrades.

The porosity of the honeycomb unit 11 is preferably in a range of 40% to 60%. When the porosity of the honeycomb unit 11 is less than 40%, exhaust gas cannot easily infiltrate into the inside of the partition wall 11b, and it becomes impossible to effectively use the silicoaluminophosphate particles for NOx purification. On the other hand, when the porosity of the honeycomb unit 11 exceeds 60%, the strength of the honeycomb unit 11 becomes insufficient.

Meanwhile, the porosity of the honeycomb 11 can be measured using a mercury intrusion method.

The aperture ratio of the honeycomb unit 11 in a cross-section vertical to the longitudinal direction is preferably in a range of 50% to 75%. When the aperture ratio of the honeycomb unit 11 in a cross-section vertical to the longitudinal direction is less than 50%, it becomes impossible to effectively use the silicoaluminophosphate particles for NOx purification. On the other hand, when the aperture ratio of the honeycomb unit 11 in a cross-section vertical to the longitudinal direction exceeds 75%, the strength of the honeycomb unit 11 becomes insufficient.

The density of the through holes 11a in the honeycomb unit 11 on a cross-section vertical to the longitudinal direction is preferably in a range of 31 holes/cm$^2$ to 155 holes/cm$^2$. When the density of the through holes 11a in the honeycomb unit 11 on a cross-section vertical to the longitudinal direction is less than 31 holes/cm$^2$, it becomes difficult for the silicoaluminophosphate particles to come into contact with exhaust gas, and NOx purification performance degrades. On the other hand, when the density of the through holes 11a in the honeycomb unit 11 on a cross-section vertical to the longitudinal direction exceeds 155 holes/cm$^2$, the pressure loss of the honeycomb structure 10 increases.

The thickness of the partition wall 11b in the honeycomb unit 11 is preferably in a range of 0.10 mm to 0.50 mm, and more preferably in a range of 0.15 mm to 0.35 mm. When the thickness of the partition wall 11b is less than 0.10 mm, the strength of the honeycomb unit 11 decreases. On the other hand, when the thickness of the partition wall 11b exceeds 0.50 mm, exhaust gas cannot easily infiltrate into the inside of the partition wall 11b, and it becomes impossible to effectively use the silicoaluminophosphate particles for NOx purification.

The thickness of the outer circumference coating layer 12 is preferably in a range of 0.1 mm to 2.0 mm. When the thickness of the outer circumference coating layer 12 is less than 0.1 mm, the effect that improves the strength of the honeycomb structure 10 becomes insufficient. On the other hand, when the thickness of the outer circumference coating layer 12 exceeds 2.0 mm, the content of the silicoaluminophosphate particles per unit volume of the honeycomb structure 10 decreases such that NOx purification performance degrades.

The shape of the honeycomb structure 10 is not limited to a circular column shape, and examples thereof include a column shape, an oval column shape, a long circular column shape, a round-chamferred rectangular column shape (for example, a round-chamferred triangular column shape) and the like.

The shape of the through hole 11a is not limited to a rectangular column shape, and examples thereof include a triangular column shape, a hexagonal column shape and the like.

In the honeycomb structure 10, the NOx purification rate is preferably 85% or more in a case in which 200° C.-hot simulant gas is made to flow so that the space velocity becomes 80000/h. At this time, the space velocity refers to the ratio of the flow rate [m$^3$/h] of the simulant gas to the apparent volume [m$^3$] of the honeycomb structure 10, and the simulant gas contains nitrogen monoxide at a concentration of 350 ppm, ammonia at a concentration of 350 ppm, oxygen at a concentration of 10%, water at a concentration of 5% and carbon dioxide at a concentration of 5% with a balance of nitrogen.

Next, an example of the method for manufacturing the honeycomb structure 10 will be described. First, raw material paste containing the silicoaluminophosphate particles and the inorganic binder, and, furthermore, one or more selected from a group consisting of inorganic fibers, scale-like substances, tetrapot-like substances and three dimensional needle-like substances as necessary is extrusion-molded, thereby producing a circular column-shaped honeycomb compact provided with a plurality of through holes arrayed in the longitudinal direction with a partition wall therebetween.

At this time, the raw material paste may further contain an organic binder, a dispersion medium, a molding assistant and the like as necessary.

The organic binder is not particularly limited, examples thereof include methyl cellulose, carboxymethyl cellulose, hydroxyethyl cellulose, polyethylene glycol, phenol resins, epoxy resins and the like, and two or more organic binders may be jointly used.

The content of the organic binder in the raw material paste is preferably in a range of 1% by mass to 10% by mass with respect to the total amount of the silicoaluminophosphate particles, the inorganic binder, the inorganic fiber, the scale-like substance, the tetrapot-like substance and the three dimensional needle-like substance.

The dispersion medium is not particularly limited, examples thereof include water, organic solvents such as benzene, alcohols such as methanol, and the like, and two or more dispersion media may be jointly used.

The molding assistant is not particularly limited, examples thereof include ethylene glycol, dextrin, aliphatic acids, aliphatic soap, polyalcohols and the like, and two or more molding assistants may be jointly used.

When preparing the raw material paste, the components are preferably mixed and kneaded. The components may be mixed using a mixer, an attritor or the like, and may be kneaded using a kneader or the like.

Next, the honeycomb compact is dried using a dryer such as a microwave dryer, a hot air dryer, a dielectric dryer, a reduced-pressure dryer, a vacuum dryer or a freeze dryer, thereby producing a dried honeycomb.

Furthermore, the dried honeycomb is defatted, thereby producing a defatted honeycomb. The defatting conditions can be appropriately selected depending on the kinds and amounts of organic substances contained in the dried honeycomb, and the dried honeycomb is preferably defatted at 400° C. for 2 hours.

Next, the defatted honeycomb is fired, thereby producing a circular column-shaped honeycomb unit 11. The firing temperature is preferably in a range of 600° C. to 1200° C., and more preferably in a range of 600° C. to 1000° C. When the firing temperature is lower than 600° C., sintering does not proceed, and the strength of the honeycomb unit 11 decreases. On the other hand, when the firing temperature exceeds 1200° C., sintering excessively proceeds such that the number of reaction sites of the silicoaluminophosphate particles decreases.

Next, paste for outer circumference coating layers is applied to the outer circumferential surface of the circular column-shaped honeycomb unit 11 excluding both end surfaces.

The paste for outer circumference coating layers is not particularly limited, and examples thereof include mixtures of an inorganic binder and inorganic particles, mixtures of an inorganic binder and an inorganic fiber, mixtures of an inorganic binder, inorganic particles and an inorganic fiber, and the like.

The inorganic binder contained in the paste for outer circumference coating layers is not particularly limited, examples thereof include solid content contained in a silica sol, an alumina sol or the like, and two or more inorganic binders may be jointly used. Among the above, the solid content contained in silica sol is preferable.

A material that configures the inorganic particles contained in the paste for outer circumference coating layers is not particularly limited, examples thereof include carbides such as silicon carbide, nitrides such as silicon nitride and boron nitride, and the like, and two or more inorganic particles may be jointly used. Among the above, silicon carbide is preferable due to the excellent thermal conductivity.

A material that configures the inorganic fiber contained in the paste for outer circumference coating layers is not particularly limited, examples thereof include silica alumina, mullite, alumina, silica and the like, and two or more inorganic fibers may be jointly used. Among the above, alumina is preferable.

The paste for outer circumference coating layers may further contain an organic binder.

The organic binder contained in the paste for outer circumference coating layers is not particularly limited, examples thereof include polyvinyl alcohol, methyl cellulose, ethyl cellulose, carboxymethyl cellulose and the like, and two or more organic binders may be jointly used.

The paste for outer circumference coating layers may further contain a balloon that is a minute hollow sphere of an oxide-based ceramic, a pore-forming agent and the like.

The balloon contained in the paste for outer circumference coating layers is not particularly limited, examples thereof include alumina balloons, glass micro balloons, shirasu balloons, fly ash balloons, mullite balloons and the like, and two or more balloons may be jointly used. Among the above, alumina balloons are preferable.

The pore-forming agent contained in the paste for outer circumference coating layers is not particularly limited, examples thereof include spherical acrylic particles, graphite and the like, and two or more pore-forming agents may be jointly used.

Next, the honeycomb unit 11 to which the paste for outer circumference coating layers has been applied is dried and solidified, thereby producing a circular column-shaped honeycomb structure 10. At this time, in a case in which the paste for outer circumference coating layers contains the organic binder, the paste for outer circumference coating layers is preferably defatted. The defatting conditions can be appropriately selected depending on the kinds and amounts of organic substances, and the paste for outer circumference coating layers is preferably defatted at 600° C. for 1 hour.

Meanwhile, the silicoaluminophosphate particles can be ion-exchanged by immersing the honeycomb unit 11 in an aqueous solution containing copper ions and/or iron ions.

In addition, raw material paste containing silicoaluminophosphate particles which have been ion-exchanged with copper ions and/or iron ions may also be used.

Figure 2:
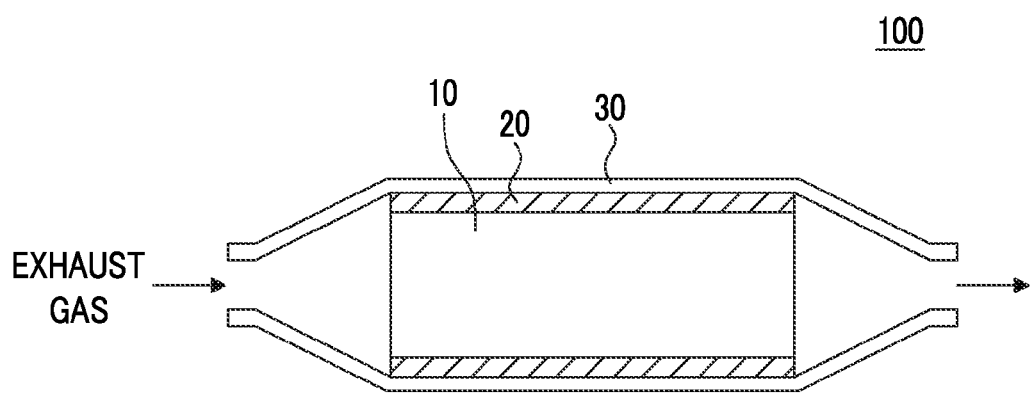
FIG. 2 is a cross-sectional view illustrating an example of an exhaust gas purifying apparatus of the invention.

FIG. 2 illustrates an example of the exhaust gas purifying apparatus of the invention. In an exhaust gas purifying apparatus 100, the honeycomb structure 10 is accommodated in a metal container (shell) 30 in a state in which a holding seal material 20 is disposed on the outer circumferential surface of the honeycomb structure excluding both end surfaces. In addition, in the exhaust gas purifying apparatus 100, spraying means (not illustrated) such as a spraying nozzle that sprays ammonia or a compound that generates ammonia when being decomposed is installed in a pipe (not illustrated) in the upper stream side of the honeycomb structure 10 in a direction in which exhaust gas flows. Thereby, ammonia is added to exhaust gas flowing in the pipe, and therefore NOx contained in the exhaust gas is reduced by the silicoaluminophosphate particles contained in the honeycomb unit 11.

The compound that generates ammonia when being decomposed is not particularly limited as long as the compound is heated by exhaust gas in the pipe so as to generate ammonia, but aqueous urea is preferable due to the excellent storage stability.

The aqueous urea is heated by exhaust gas in the pipe and hydrolyzed, thereby generating ammonia.

Figure 3:
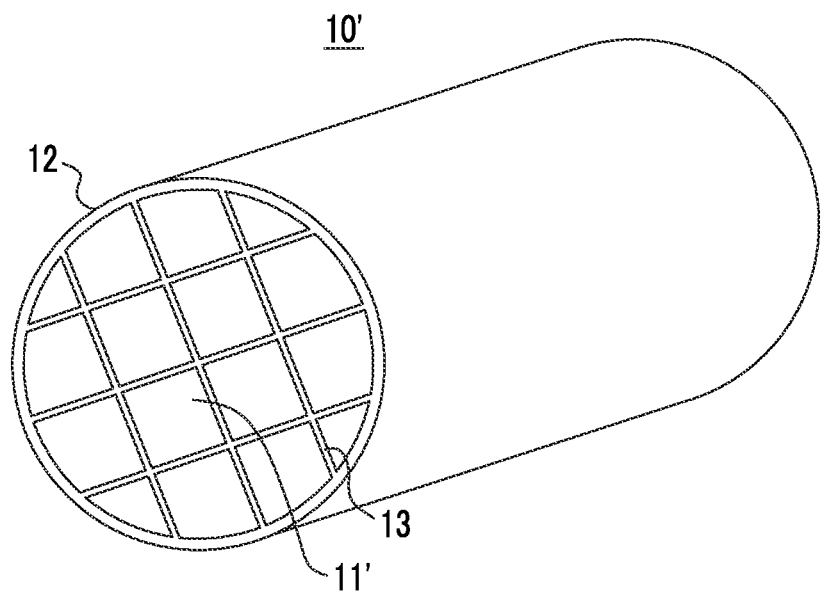
FIG. 3 is a perspective view illustrating another example of the honeycomb structure of the invention.
Figure 4:
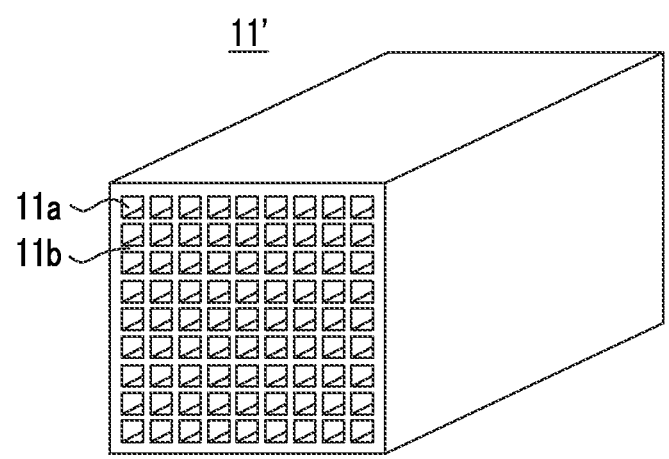
FIG. 4 is a perspective view illustrating a honeycomb unit that configures the honeycomb structure of FIG. 3.

FIG. 3 illustrates another example of the honeycomb structure of the invention. Meanwhile, a honeycomb structure 10' has the same configuration as the honeycomb structure 10 except that a plurality of honeycomb units 11' (refer to FIG. 4) provided with a plurality of the through holes 11a arrayed in a longitudinal direction with the partition wall 11b therebetween is adhered to each other through an adhesion layer 13.

The cross-sectional area of a cross-section of the honeycomb unit 11' vertical to the longitudinal direction is preferably in a range of 5 cm$^2$ to 50 cm$^2$. When the cross-sectional area of a cross-section of the honeycomb unit 11' vertical to the longitudinal direction is smaller than 5 cm$^2$, the pressure loss of the honeycomb structure 10' increases. On the other hand, when the cross-sectional area of a cross-section of the honeycomb unit 11' vertical to the longitudinal direction exceeds 50 cm², the strength against thermal stress generated in the honeycomb unit 11' becomes insufficient.

Except for the honeycomb units 11' located in an outer circumferential portion of the honeycomb structure 10', the shape of the honeycomb unit 11' is not limited to a rectangular column shape, and examples thereof include a hexagonal column shape and the like.

Meanwhile, the honeycomb unit 11' has the same configuration as the honeycomb unit 11 except for the cross-sectional area of a cross-section vertical to the longitudinal direction and the shape.

The thickness of the adhesion layer 13 is preferably in a range of 0.5 mm to 2.0 mm. When the thickness of the adhesion layer 13 is less than 0.5 mm, the adhesion strength of the honeycomb unit 11' becomes insufficient. On the other hand, when the thickness of the adhesion layer 13 exceeds 2.0 mm, the pressure loss of the honeycomb structure 10' increases.

Next, an example of the method for manufacturing the honeycomb structure 10' will be described. First, similarly to the honeycomb structure 10, rectangular column-shaped honeycomb units 11' are produced. Next, paste for the adhesion layer is applied to the outer circumferential surfaces of a plurality of the honeycomb units 11' excluding both end surfaces, the honeycomb units are adhered to each other, then, dried and solidified, thereby producing a collection of the honeycomb units 11'.

The paste for the adhesion layer is not particularly limited, and examples thereof include mixtures of an inorganic binder and inorganic particles, mixtures of an inorganic binder and an inorganic fiber, mixtures of an inorganic binder, inorganic particles and an inorganic fiber, and the like.

The inorganic binder contained in the paste for the adhesion layer is not particularly limited, examples thereof include solid content contained in a silica sol, an alumina sol or the like, and two or more inorganic binders may be jointly used. Among the above, the solid content contained in silica sol is preferable.

A material that configures the inorganic particles contained in the paste for the adhesion layer is not particularly limited, examples thereof include carbides such as silicon carbide, nitrides such as silicon nitride and boron nitride, and the like, and two or more inorganic particles may be jointly used. Among the above, silicon carbide is preferable due to the excellent thermal conductivity.

A material that configures the inorganic fiber contained in the paste for the adhesion layer is not particularly limited, examples thereof include silica alumina, mullite, alumina, silica and the like, and two or more inorganic fibers may be jointly used. Among the above, alumina is preferable.

In addition, the paste for the adhesion layer may further contain an organic binder.

The organic binder contained in the paste for the adhesion layer is not particularly limited, examples thereof include polyvinyl alcohol, methyl cellulose, ethyl cellulose, carboxymethyl cellulose and the like, and two or more organic binders may be jointly used.

The paste for the adhesion layer may further contain a balloon that is a minute hollow sphere of an oxide-based ceramic, a pore-forming agent and the like.

The balloon contained in the paste for the adhesion layer is not particularly limited, examples thereof include alumina balloons, glass micro balloons, shirasu balloons, fly ash balloons, mullite balloons and the like, and two or more balloons may be jointly used. Among the above, alumina balloons are preferable.

The pore-forming agent contained in the paste for the adhesion layer is not particularly limited, examples thereof include spherical acrylic particles, graphite and the like, and two or more pore-forming agents may be jointly used.

Next, the collection of the honeycomb units 11' is cut into a circular column shape, and then ground as necessary, thereby producing a circular column-shaped collection of the honeycomb units 11'.

Meanwhile, instead of cutting the collection of the honeycomb units 11' into a circular column shape, it is also possible to adhere the honeycomb units 11' to honeycomb units having a predetermined cross-sectional shape vertical to the longitudinal direction, thereby producing a circular column-shaped collection of the honeycomb units.

Next, paste for outer circumference coating layers is applied to the outer circumferential surfaces of the circular column-shaped collection of the honeycomb units 11' excluding both end surfaces.

The paste for outer circumference coating layers may be the same as or different from the paste for the adhesion layer.

Next, the circular column-shaped collection of the honeycomb units 11' to which the paste for outer circumference coating layers has been applied is dried and solidified, thereby producing a circular column-shaped honeycomb structure 10'. At this time, in a case in which the paste for the adhesion layer and/or the paste for outer circumference coating layers contain the organic binder, the paste is preferably defatted. The defatting conditions can be appropriately selected depending on the kinds and amounts of organic substances, and the paste is preferably defatted at 600° C. for 1 hour.

Figure 5:
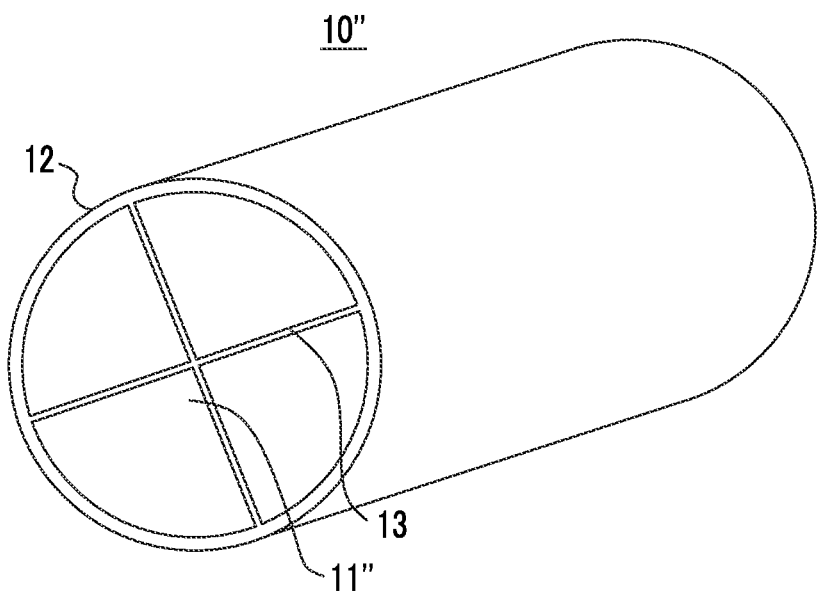
FIG. 5 is a perspective view illustrating another example of the honeycomb structure of the invention.
Figure 6:
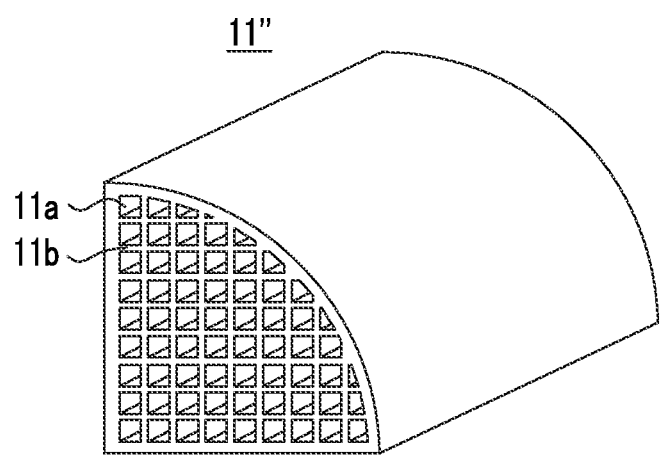
FIG. 6 is a perspective view illustrating a honeycomb unit that configures the honeycomb structure of FIG. 5.

FIG. 5 illustrates another example of the honeycomb structure of the invention. Meanwhile, the honeycomb structure 10" has the same configuration as the honeycomb structure 10' except that four honeycomb units 11" having a cross-sectional shape vertical to the longitudinal direction which is shaped like a fan with a center angle of 90° are adhered to each other (refer to FIG. 6).

Meanwhile, the honeycomb structures 10, 10' and 10" may not have the outer circumference coating layer 12 formed therein.

In addition to the configuration including the honeycomb unit produced by extrusion-molding and then firing the raw material paste containing the silicoaluminophosphate particles and the inorganic binder, the honeycomb structure of the invention may have a configuration in which a honeycomb unit containing cordierite is provided and the silicoaluminophosphate particles are supported by the partition wall. Thereby, NOx can be purified. In addition, it is possible to suppress the occurrence of cracking of the silicoaluminophosphate particles and the detachment of the silicoaluminophosphate particles which are induced by contraction or expansion caused by water adsorption or desorption.

Meanwhile, even in a case in which the silicoaluminophosphate particles are used as a material for the honeycomb structure, it is possible to crush the silicoaluminophosphate particles so as to decrease the average diameter of original silicoaluminophosphate particles.

The average diameter of original silicoaluminophosphate particles of the silicoaluminophosphate particles is preferably in a range of 1 μm to 5 μm. When the average diameter of original silicoaluminophosphate particles of the silicoaluminophosphate particles is less than 1 μm, it becomes difficult to support the silicoaluminophosphate particles by the partition wall. On the other hand, when the average diameter of original silicoaluminophosphate particles of the silicoaluminophosphate particles exceeds 5 μm, the specific surface area of the silicoaluminophosphate particles decreases such that NOx purification performance degrades.

The honeycomb structure preferably includes a single honeycomb unit, similarly to the honeycomb structure 10 (refer to FIG. 1).

Meanwhile, the honeycomb structure may or may not have the outer circumference coating layer formed therein.

In addition, the honeycomb structure can be applied to the exhaust gas purifying apparatus illustrated in FIG. 2, similarly to the honeycomb structure 10.

EXAMPLES

In the present examples, 'parts' refer to 'parts by mass'.

Example 1

An aqueous solution of phosphoric acid with a concentration of 85% by mass (9.8 parts), an aqueous solution of aluminum hydroxide with a concentration of 95% by mass (7.0 parts), a silica sol containing 30% by mass of a solid content (5.5 parts) and morpholine (11.3 parts) as a structure directing agent were sequentially added to water, and stirred, thereby obtaining a precursor gel. Next, the precursor gel was sealed in an autoclave (200 ml), heated to 200° C. at a temperature-rise rate of 5° C./minute while being rotated at a rotation rate of 10 rpm, and held for 24 hours, thereby producing silicoaluminophosphate particles.

Furthermore, the silicoaluminophosphate particles were immersed in an aqueous solution of copper nitrate, thereby ion-exchanging the silicoaluminophosphate particles with copper ions. The amount of the silicoaluminophosphate particles exchanged with copper ions was 2.7% by mass.

Next, the silicoaluminophosphate particles ion-exchanged with copper ions were crushed so as to obtain an average diameter of original silicoaluminophosphate particles of 3.0 μm, and then treated in an aqueous solution of ammonia with a concentration of 5% by mass for 30 minutes. Furthermore, an aqueous solution (2 parts by mass) of nitric acid having a concentration of 10% by mass was added, and stirred, thereby obtaining a precursor gel. As for the dried precursor gel, the ratio of the amount of Si to the sum of the amounts of Al and P was 0.16, the specific surface area was 360 $m^2/g$, and the external surface area was 22 $m^2/g$.

Example 2

As a result of producing silicoaluminophosphate particles in the same manner as in Example 1 except that the silicoaluminophosphate particles were treated in an aqueous solution of ammonia with a concentration of 5% by mass for 15 minutes, the ratio of the amount of Si to the sum of the amounts of Al and P was 0.16, the specific surface area was 400 $m^2/g$, and the external surface area was 10 $m^2/g$.

Example 3

As a result of producing silicoaluminophosphate particles in the same manner as in Example 1 except that the silicoaluminophosphate particles were treated in an aqueous solution of ammonia with a concentration of 5% by mass for 60 minutes, the ratio of the amount of Si to the sum of the amounts of Al and P was 0.16, the specific surface area was 305 $m^2/g$, and the external surface area was 35 $m^2/g$.

Example 4

An aqueous solution of phosphoric acid with a concentration of 85% by mass (9.8 parts), an aqueous solution of aluminum hydroxide with a concentration of 95% by mass (7.0 parts), a silica sol containing 30% by mass of a solid content (7.9 parts) and morpholine (11.3 parts) as a structure directing agent were sequentially added to water, and stirred, thereby obtaining a precursor gel. Next, the precursor gel was sealed in an autoclave (200 ml), heated to 200° C. at a temperature-rise rate of 5° C./minute while being rotated at a rotation rate of 10 rpm, and held for 24 hours, thereby producing silicoaluminophosphate particles.

Furthermore, the silicoaluminophosphate particles were immersed in an aqueous solution of copper nitrate, thereby ion-exchanging the silicoaluminophosphate particles with copper ions. The amount of the silicoaluminophosphate particles exchanged with copper ions was 2.7% by mass.

Next, the silicoaluminophosphate particles ion-exchanged with copper ions were crushed so as to obtain an average diameter of original silicoaluminophosphate particles of 3.0 μm, and then treated in an aqueous solution of ammonia with a concentration of 5% by mass for 60 minutes. Furthermore, an aqueous solution (2 parts by mass) of nitric acid having a concentration of 10% by mass was added, and stirred, thereby obtaining a precursor gel. As for the dried precursor gel, the ratio of the amount of Si to the sum of the amounts of Al and P was 0.23, the specific surface area was 325 $m^2/g$, and the external surface area was 25 $m^2/g$.

Example 5

As a result of producing silicoaluminophosphate particles in the same manner as in Example 4 except that the silicoaluminophosphate particles were treated in an aqueous solution of ammonia with a concentration of 5% by mass for 20 minutes, the ratio of the amount of Si to the sum of the amounts of Al and P was 0.23, the specific surface area was 435 $m^2/g$, and the external surface area was 14 $m^2/g$.

Example 6

An aqueous solution of phosphoric acid with a concentration of 85% by mass (9.8 parts), an aqueous solution of aluminum hydroxide with a concentration of 95% by mass (7.0 parts), a silica sol containing 30% by mass of a solid content (9.6 parts) and morpholine (11.3 parts) as a structure directing agent were sequentially added to water, and stirred, thereby obtaining a precursor gel. Next, the precursor gel was sealed in an autoclave (200 ml), heated to 200° C. at a temperature-rise rate of 5° C./minute while being rotated at a rotation rate of 10 rpm, and held for 24 hours, thereby producing silicoaluminophosphate particles.

Furthermore, the silicoaluminophosphate particles were immersed in an aqueous solution of copper nitrate, thereby ion-exchanging the silicoaluminophosphate particles with copper ions. The amount of the silicoaluminophosphate particles exchanged with copper ions was 2.7% by mass.

Next, the silicoaluminophosphate particles ion-exchanged with copper ions were crushed so as to obtain an average diameter of original silicoaluminophosphate particles of 3.0 μm, and then treated in an aqueous solution of ammonia with a concentration of 5% by mass for 120 minutes. Furthermore, an aqueous solution (2 parts by mass) of nitric acid having a concentration of 10% by mass was added, and stirred, thereby obtaining a precursor gel. As for the dried precursor gel, the ratio of the amount of Si to the sum of the amounts of Al and P was 0.28, the specific surface area was 260 $m^2/g$, and the external surface area was 28 $m^2/g$.

Example 7

As a result of producing silicoaluminophosphate particles in the same manner as in Example 6 except that the silicoaluminophosphate particles were treated in an aqueous solution of ammonia with a concentration of 5% by mass for 10 minutes, the ratio of the amount of Si to the sum of the amounts of Al and P was 0.28, the specific surface area was 445 m$^2$/g, and the external surface area was 18 m$^2$/g.

Comparative Example 1

An aqueous solution of phosphoric acid with a concentration of 85% by mass (9.8 parts), an aqueous solution of aluminum hydroxide with a concentration of 95% by mass (7.0 parts), a silica sol containing 30% by mass of a solid content (5.1 parts) and morpholine (11.3 parts) as a structure directing agent were sequentially added to water, and stirred, thereby obtaining a precursor gel. Next, the precursor gel was sealed in an autoclave (200 ml), heated to 200° C. at a temperature-rise rate of 5° C./minute while being rotated at a rotation rate of 10 rpm, and held for 24 hours, thereby producing silicoaluminophosphate particles.

Furthermore, the silicoaluminophosphate particles were immersed in an aqueous solution of copper nitrate, thereby ion-exchanging the silicoaluminophosphate particles with copper ions. The amount of the silicoaluminophosphate particles exchanged with copper ions was 2.7% by mass.

Next, the silicoaluminophosphate particles ion-exchanged with copper ions were crushed so as to obtain an average diameter of original silicoaluminophosphate particles of 3.0 μm, and then treated in an aqueous solution of ammonia with a concentration of 5% by mass for 30 minutes. Furthermore, an aqueous solution (2 parts by mass) of nitric acid having a concentration of 10% by mass was added, and stirred, thereby obtaining a precursor gel. As for the dried precursor gel, the ratio of the amount of Si to the sum of the amounts of Al and P was 0.15, the specific surface area was 365 m$^2$/g, and the external surface area was 16 m$^2$/g.

Comparative Example 2

As a result of producing silicoaluminophosphate particles in the same manner as in Comparative Example 1 except that the silicoaluminophosphate particles were treated in an aqueous solution of ammonia with a concentration of 5% by mass for 60 minutes, the ratio of the amount of Si to the sum of the amounts of Al and P was 0.15, the specific surface area was 280 m$^2$/g, and the external surface area was 20 m$^2$/g.

Comparative Example 3

As a result of producing silicoaluminophosphate particles in the same manner as in Example 1 except that the silicoaluminophosphate particles were treated in an aqueous solution of ammonia with a concentration of 5% by mass for 120 minutes, the ratio of the amount of Si to the sum of the amounts of Al and P was 0.16, the specific surface area was 240 m$^2$/g, and the external surface area was 21 m$^2$/g.

Comparative Example 4

As a result of producing silicoaluminophosphate particles in the same manner as in Example 1 except that the silicoaluminophosphate particles were treated in an aqueous solution of ammonia with a concentration of 5% by mass for 20 minutes, the ratio of the amount of Si to the sum of the amounts of Al and P was 0.16, the specific surface area was 370 m$^2$/g, and the external surface area was 8 m$^2$/g.

Comparative Example 5

As a result of producing silicoaluminophosphate particles in the same manner as in Example 4 except that the silicoaluminophosphate particles were treated in an aqueous solution of ammonia with a concentration of 5% by mass for 45 minutes, the ratio of the amount of Si to the sum of the amounts of Al and P was 0.23, the specific surface area was 300 m$^2$/g, and the external surface area was 6 m$^2$/g.

Comparative Example 6

As a result of producing silicoaluminophosphate particles in the same manner as in Example 4 except that the silicoaluminophosphate particles were treated in an aqueous solution of ammonia with a concentration of 5% by mass for 10 minutes, the ratio of the amount of Si to the sum of the amounts of Al and P was 0.23, the specific surface area was 470 m$^2$/g, and the external surface area was 12 m$^2$/g.

Comparative Example 7

As a result of producing silicoaluminophosphate particles in the same manner as in Example 6 except that the silicoaluminophosphate particles were treated in an aqueous solution of ammonia with a concentration of 5% by mass for 12 minutes, the ratio of the amount of Si to the sum of the amounts of Al and P was 0.28, the specific surface area was 430 m$^2$/g, and the external surface area was 5 m$^2$/g.

[Ratio of the Amount of Si to the Sum of the Amounts of Al and P]

The ratio of the amount of Si to the sum of the amounts of Al and P in the silicoaluminophosphate particles was measured using a silicon drift energy dispersive X-ray detector XFlash5030 (manufactured by Bruker Corporation).

[Ion Exchange Amount]

The amount of the silicoaluminophosphate particles exchanged with copper ions was measured by carrying out ICP atomic emission spectrometry using an ICPS-8100 (manufactured by Shimadzu Corporation).

[Average Diameter of Original Silicoaluminophosphate Particles]

The average diameter of original silicoaluminophosphate particles of the silicoaluminophosphate particles was measured using a laser diffraction particle size distribution analyzer MAS5001 (manufactured by Malvern Instruments Ltd.).

[Specific Surface Area and External Surface Area]

The plot of the adsorption amount V [cm$^3$(STP)·g$^{-1}$] with respect to the relative pressure P/P$_0$, that is, the nitrogen adsorption and desorption isotherm was produced using an automatic surface area and porosimetry analyzer TriStar-3000 (manufactured by Shimadzu Corporation), and the specific surface area and external surface area of the silicoaluminophosphate particles were obtained using a BET multipoint method and a t-plot method. Specifically, the specific surface area was obtained from the plot of P/V(P$_0$-P) [g·cm$^3$(STP)$^{-1}$] with respect to the relative pressure P/P$_0$, that is, a BET plot, and the external surface area was obtained from the plot of P/V(P$_0$-P) [g·cm$^3$(STP)$^{-1}$] with respect to the thickness t [nm] of an adsorption layer, that is, a t-plot.

[Production of a Honeycomb Structure]

Each of the silicoaluminophosphate particles (3000 parts) of the examples and the comparative examples, boehmite (1190 parts), an alumina fiber having an average fiber diameter of 6 μm and an average fiber length of 100 μm (720 parts), methyl cellulose (290 parts), oleic acid (310 parts) and ion exchange water (1820 parts) were mixed and kneaded, thereby producing raw material paste.

Next, the raw material paste was extrusion-molded using an extrusion molder, thereby producing a honeycomb compact having a fan-like column shape. In addition, the honeycomb compact was dried at 110° C. for 10 minutes using a microwave dryer and a hot air dryer, thereby producing a dried honeycomb. Furthermore, the honeycomb compact was defatted at 400° C. for 5 hours, thereby producing a defatted honeycomb. Next, the defatted honeycomb was fired at 700° C. for 2 hours, thereby producing a honeycomb unit. The honeycomb unit has a fan-like column shape with a radius of 132 mm, a center angle of 90° and a length of 76.2 mm, the thickness of a partition wall was 0.20 mm, and the density of through holes was 124 holes/cm².

Meanwhile, an alumina fiber having an average fiber diameter of 6 μm and an average fiber length of 100 μm (767 parts), silica glass (2500 parts), carboxymethyl cellulose (17 parts), a silica sol containing 30% by mass of a solid content (600 parts), a polyvinyl alcohol (167 parts) and an aluminum balloon (17 parts) were mixed and kneaded, thereby producing paste for the adhesion layer.

The paste for the adhesion layer was applied to the outer circumferential surface of the honeycomb unit excluding end surfaces so that the thickness of the adhesion layer 13 becomes 1.0 mm, four honeycomb units are adhered to each other, then, dried and solidified at 150° C. for 10 minutes, thereby producing a circular column-shaped collection of the honeycomb units.

Furthermore, the paste for the adhesion layer was applied to the outer circumferential surface of the collection of the honeycomb units excluding end surfaces so that the thickness of the outer circumference coating layer 12 becomes 1.0 mm, then, the paste for the adhesion layer was dried, solidified at 150° C. for 10 minutes using a microwave dryer and a hot air dryer, and defatted at 600° C. for 1 hour, thereby producing a honeycomb structure.

[Cracking]

Whether cracking occurred in the honeycomb unit was visually evaluated. Meanwhile, a case in which cracking occurred was determined to be X, and a case in which cracking did not occur was determined to be O.

[NOx Purification Rate]

From the honeycomb unit, a circular column-shaped test specimen with a diameter of 25.4 mm and a length of 76.2 mm was cut using a diamond cutter.

The amount of NOx flowing out of the test specimen was measured using an automotive exhaust gas measuring apparatus MEXA-6000FT (manufactured by Horiba, Ltd.) while flowing a 200° C.-hot simulant gas into the test specimen at a space velocity (SV) of 80000/h, and the purification rate [%] of NOx represented by a formula (the inflow amount of NOx−the outflow amount of NOx)/(the inflow amount of NOx)×100 was computed.

Meanwhile, the space velocity (SV) refers to the ratio of the flow rate [m³/h] of the simulant gas to the apparent volume [m³] of the test specimen, and the simulant gas contains nitrogen monoxide at a concentration of 350 ppm, ammonia at a concentration of 350 ppm, oxygen at a concentration of 10%, water at a concentration of 5% and carbon dioxide at a concentration of 5% with a balance of nitrogen.

Table 1 describes the evaluation results of the Si/(Al+P) of the silicoaluminophosphate particles of Examples 1 to 7 and Comparative Examples 1 to 7, the specific surface areas and external surface areas of the silicoaluminophosphate particles, whether cracking occurred in the honeycomb structures, and the NOx purification rates of the honeycomb structures.

TABLE 1

| | Silicoaluminophosphate particles | | | Honeycomb structure | |
|---|---|---|---|---|---|
| | Si/(Al + P) | Specific surface area [m²/g] | External surface area [m²/g] | Cracking | Purification rate of NOx [%] |
| Example 1 | 0.16 | 360 | 22 | O | 89 |
| Example 2 | 0.16 | 400 | 10 | O | 87 |
| Example 3 | 0.16 | 305 | 35 | O | 85 |
| Example 4 | 0.23 | 325 | 25 | O | 87 |
| Example 5 | 0.23 | 435 | 14 | O | 94 |
| Example 6 | 0.28 | 260 | 28 | O | 86 |
| Example 7 | 0.28 | 445 | 18 | O | 97 |
| Comparative Example 1 | 0.15 | 365 | 16 | X | 77 |
| Comparative Example 2 | 0.15 | 280 | 20 | X | 75 |
| Comparative Example 3 | 0.16 | 240 | 21 | O | 75 |
| Comparative Example 4 | 0.16 | 370 | 8 | X | 85 |
| Comparative Example 5 | 0.23 | 300 | 6 | X | 83 |
| Comparative Example 6 | 0.23 | 470 | 12 | X | 88 |
| Comparative Example 7 | 0.28 | 430 | 5 | X | 89 |

Meanwhile, Si/(Al+P) refers to the ratio of the amount of Si to the sum of the amounts of Al and P.

It is found from Table 1 that, in the silicoaluminophosphate particles of Examples 1 to 7, the Si/(Al+P) is in a range of 0.16 to 0.28, the specific surface areas are in a range of 260 m²/g to 445 m²/g, and the external surface areas are in a range of 10 m²/g to 35 m²/g, and, in the honeycomb structures produced using the silicoaluminophosphate particles of Examples 1 to 7, cracking does not occur in the honeycomb unit. Therefore, it is considered that the silicoaluminophosphate particles of Examples 1 to 7 can suppress the occurrence of cracking in the honeycomb unit which is induced by contraction and expansion caused by water adsorption and desorption. In addition, in the honeycomb structures produced using the silicoaluminophosphate particles of Examples 1 to 7, the NOx purification rates are in a range of 85% to 97%, and therefore it is found that the silicoaluminophosphate particles are excellent in terms of NOx purification performance.

On the other hand, it is found that, in the silicoaluminophosphate particles of Comparative Examples 1 and 2, the Si/(Al+P) is 0.15, and, in the honeycomb structures produced using the silicoaluminophosphate particles of Comparative Examples 1 and 2, cracking occurs in the honeycomb unit. Therefore, it is considered that the silicoaluminophosphate particles of Comparative Examples 1 and 2 cannot suppress the occurrence of cracking in the honeycomb unit which is induced by contraction and expansion caused by water adsorption and desorption. In addition, in the honeycomb structures produced using the silicoaluminophosphate particles of Comparative Examples 1 and 2, the NOx purification rates are in a range of 75% to 77%, and therefore it is found that the NOx purification performance degrades.

It is found that, in the silicoaluminophosphate particles of Comparative Example 3, the specific surface area is 240 m²/g, and, in the honeycomb structure produced using the silicoaluminophosphate particles of Comparative Example 3, the NOx purification rate is 75%, and therefore it is found that the NOx purification performance degrades.

It is found that, in the silicoaluminophosphate particles of Comparative Examples 4, 5 and 7, the external surface areas are in a range of 5 m²/g to 8 m²/g, and, in the honeycomb structures produced using the silicoaluminophosphate particles of Comparative Examples 4, 5 and 7, cracking occurs in the honeycomb unit. Therefore, it is considered that the silicoaluminophosphate particles of Comparative Examples 4, 5 and 7 cannot suppress the occurrence of cracking in the honeycomb unit which is induced by contraction and expansion caused by water adsorption and desorption.

It is found that, in the silicoaluminophosphate particles of Comparative Example 6, the specific surface area is 470 m²/g, and, in the honeycomb structures produced using the silicoaluminophosphate particles of Comparative Example 6, cracking occurs in the honeycomb unit. Therefore, it is considered that the silicoaluminophosphate particles of Comparative Example 6 cannot suppress the occurrence of cracking in the honeycomb unit which is induced by contraction and expansion caused by water adsorption and desorption.

REFERENCE SIGNS LIST 10, 10', 10" HONEYCOMB STRUCTURE
11, 11', 11" HONEYCOMB UNIT
11a THROUGH HOLE
11b PARTITION WALL
12 OUTER CIRCUMFERENCE COATING LAYER
13 ADHESION LAYER
20 HOLDING SEAL MATERIAL
30 METAL CONTAINER
100 EXHAUST GAS PURIFYING APPARATUS

The invention claimed is:

1. Silicoaluminophosphate particles, wherein a ratio of an amount of Si to a sum of amounts of Al and P is in a range of 0.16 to 0.33, a specific surface area is in a range of 250 m²/g to 450 m²/g, and an external surface area is in a range of 10 m²/g to 35 m²/g.

2. The silicoaluminophosphate particles according to claim 1, wherein the specific surface area is in a range of 300 m²/g to 440 m²/g.

3. The silicoaluminophosphate particles according to claim 2, wherein the specific surface area is in a range of 320 m²/g to 400 m²/g.

4. The silicoaluminophosphate particles according to claim 1, wherein the external surface area is in a range of 15 m²/g to 30 m²/g.

5. The silicoaluminophosphate particles according to claim 4, wherein the external surface area is in a range of 20 m²/g to 30 m²/g.

6. The silicoaluminophosphate particles according to claim 1, wherein the silicoaluminophosphate particles are ion-exchanged with copper ions and/or iron ions.

7. A honeycomb structure comprising:
a honeycomb unit provided with a plurality of through holes arrayed in a longitudinal direction with a partition wall therebetween,
wherein the honeycomb unit is produced by extrusion-molding and firing raw material paste containing the silicoaluminophosphate particles according to claim 1 and an inorganic binder.

8. The honeycomb structure according to claim 7, wherein, in the honeycomb unit, a content of the silicoaluminophosphate particles per apparent volume is in a range of 230 g/L to 360 g/L, and the apparent volume refers to a volume of an outer circumference including a volume of voids.

9. The honeycomb structure according to claim 7, wherein the inorganic binder is a solid content contained in one or more selected from the group consisting of an alumina sol, a silica sol, a titania sol, water glass, sepiolite, attapulgite and boehmite.

10. The honeycomb structure according to claim 7, wherein the raw material paste further contains one or more selected from the group consisting of inorganic fibers, scale-like substances, tetrapot-like substances and three dimensional needle-like substances.

11. The honeycomb structure according to claim 10, wherein the inorganic fiber is one or more selected from the group consisting of alumina, silica, silicon carbide, silica alumina, glass, potassium titanate and aluminum borate; the scale-like substance is one or more selected from the group consisting of glass, muscovite, alumina and silica; the tetrapot-like substance is zinc oxide; and the three dimensional needle-like substance is one or more selected from the group consisting of alumina, silica, silicon carbide, silica alumina, glass, potassium titanate, aluminum borate and boehmite.

12. The honeycomb structure according to claim 7, comprising:
a plurality of the honeycomb units.

13. The honeycomb structure according to claim 7, wherein a NOx purification rate is 85% or more in a case in which 200° C.-hot simulant gas is made to flow into the honeycomb structure so that a space velocity becomes 80000/h, the space velocity is a ratio of a flow rate [m³/h] of the simulant gas to an apparent volume [m³] of the honeycomb structure, and the simulant gas contains nitrogen monoxide at a concentration of 350 ppm, ammonia at a concentration of 350 ppm, oxygen at a concentration of 10%, water at a concentration of 5% and carbon dioxide at a concentration of 5% with a balance of nitrogen.

14. A honeycomb structure comprising:
a honeycomb unit which contains cordierite and is provided with a plurality of through holes arrayed in a longitudinal direction with a partition wall therebetween, wherein the silicoaluminophosphate particles according to claim 1 are supported by the partition wall.

15. A method for manufacturing a honeycomb structure provided with a plurality of through holes arrayed in a longitudinal direction with a partition wall therebetween, comprising:
a step of extrusion-molding raw material paste containing the silicoaluminophosphate particles according to claim 1 and an inorganic binder; and
a step of firing the extrusion-molded raw material paste so as to produce the honeycomb unit.

16. An exhaust gas purifying apparatus, wherein a honeycomb structure according to claim 1 is accommodated in a metal container in a state in which a holding seal material is disposed on an outer circumferential surface of the honeycomb structure excluding both end surfaces.

* * * * *